US011881185B2

(12) United States Patent
Yu et al.

(10) Patent No.: US 11,881,185 B2
(45) Date of Patent: Jan. 23, 2024

(54) DISPLAY MODULE AND DISPLAY METHOD THEREOF, AND DISPLAY DEVICE

(71) Applicants: Fuzhou BOE Optoelectronics Technology Co., Ltd., Fujian (CN); BOE Technology Group Co., Ltd., Beijing (CN)

(72) Inventors: Hui Yu, Beijing (CN); Xin Fang, Beijing (CN); Kai Diao, Beijing (CN); Jie Liu, Beijing (CN); Chengkun Liu, Beijing (CN); Xin Chen, Beijing (CN)

(73) Assignees: Fuzhou BOE Optoelectronics Technology Co., Ltd., Fujian (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/584,253

(22) Filed: Jan. 25, 2022

(65) Prior Publication Data

US 2022/0238079 A1 Jul. 28, 2022

(30) Foreign Application Priority Data

Jan. 26, 2021 (CN) ......................... 202110104360.6

(51) Int. Cl.
*G09G 3/36* (2006.01)

(52) U.S. Cl.
CPC ....... *G09G 3/36* (2013.01); *G09G 2310/0291* (2013.01); *G09G 2320/041* (2013.01); *G09G 2320/0626* (2013.01)

(58) Field of Classification Search
CPC ............. G09G 3/36; G09G 2310/0291; G09G 2320/041; G09G 2320/0626
See application file for complete search history.

(56) References Cited

U.S. PATENT DOCUMENTS

2006/0157710 A1* 7/2006 Lee ......................... H01L 27/12 257/E27.113
2009/0279584 A1* 11/2009 Tai ......................... G01K 3/005 374/178
2012/0075362 A1 3/2012 Ichioka et al.
(Continued)

FOREIGN PATENT DOCUMENTS

CN 102918582 A 2/2013
CN 110111749 A 8/2019
(Continued)

OTHER PUBLICATIONS

CN202110104360.6 first office action.

*Primary Examiner* — Chanh D Nguyen
*Assistant Examiner* — Ngan T. Pham-Lu
(74) *Attorney, Agent, or Firm* — IPRO, PLLC

(57) ABSTRACT

A display module is provided. The display module includes a main display panel, an auxiliary display panel and a backlight module which are laminated sequentially, at least one temperature sensing circuit in the auxiliary display panel, and a control circuit coupled to the at least one temperature sensing circuit. The temperature sensing circuit is configured to generate, based on temperature of the auxiliary display panel, a temperature signal related to the temperature, and the control circuit is configured to adjust a display parameter of the main display panel based on the temperature signal.

17 Claims, 8 Drawing Sheets

108

(56) References Cited

U.S. PATENT DOCUMENTS

| | | | | |
|---|---|---|---|---|
| 2012/0223932 | A1* | 9/2012 | Zhao | G09G 3/3696 345/212 |
| 2013/0057599 | A1 | 3/2013 | Teranuma et al. | |
| 2018/0277047 | A1* | 9/2018 | Dai | G09G 3/3413 |
| 2019/0227022 | A1* | 7/2019 | Harley-Trochimczyk | A61B 5/7203 |
| 2019/0235540 | A1* | 8/2019 | Cao | H10K 59/12 |
| 2019/0362680 | A1* | 11/2019 | Chang | G09G 3/344 |

FOREIGN PATENT DOCUMENTS

| | | | | |
|---|---|---|---|---|
| KR | 20080079862 | A | 9/2008 | |
| WO | 2010146885 | A1 | 12/2010 | |
| WO | WO-2019004571 | A1 * | 1/2019 | G06F 3/1446 |

* cited by examiner

DISPLAY MODULE AND DISPLAY METHOD THEREOF, AND DISPLAY DEVICE

CROSS-REFERENCE TO RELATED APPLICATION

This application claims priority to Chinese Patent Application No. 202110104360.6, filed on Jan. 26, 2021 and entitled "DISPLAY MODULE AND DISPLAY METHOD THEREOF" and the disclosure of which is herein incorporated by reference in its entirety.

TECHNICAL FIELD

The present disclosure relates to the field of display technologies, and in particular, to a display module and a display method thereof, and a display device.

BACKGROUND

With an increasing demand for high-end display devices in the market, display devices with high-illumination, high-contrast and high-resolution have become popular with consumers. The performance of the display devices used in media and design industries is often several times higher than that of home display devices.

In the dual-cell display technology, two display panels are laminated for display. A main display panel is configured to form visual color stimulation, and an auxiliary display panel is configured to finely control the brightness of backlight. The display device using the dual-cell display technology can bring ultra-high contrast, and can provide viewers with better dark-state details.

SUMMARY

The present disclosure provides a display module and a display method thereof and a display device.

In a first aspect of the present disclosure, a display module is provided. The display module includes: a main display panel, an auxiliary display panel and a backlight module which are laminated sequentially; at least one temperature sensing circuit in the auxiliary display panel, wherein the temperature sensing circuit is configured to generate, based on temperature of the auxiliary display panel, a temperature signal related to the temperature; and a control circuit coupled to the at least one temperature sensing circuit, wherein the control circuit is configured to adjust a display parameter of the main display panel based on the temperature signal.

In some embodiments, the control circuit is configured to: determine a compensation display parameter of the main display panel based on the temperature signal; and adjust the display parameter of the main display panel with the compensation display parameter.

In some embodiments, the temperature sensing circuit includes a thin film transistor, and the temperature signal is a source/drain current of the thin film transistor.

In some embodiments, the temperature sensing circuit includes a thin film transistor and a sampling resistor, the sampling resistor being connected in series between the thin film transistor and a reference voltage terminal, and the temperature signal is a node voltage of a connection node between the sampling resistor and the thin film transistor.

In some embodiments, the control circuit includes: a signal amplifying circuit, coupled to the temperature sensing circuit and configured to acquire an amplified signal by amplifying the temperature signal generated by the temperature sensing circuit; a signal processing circuit, coupled to the signal amplifying circuit and configured to determine a compensation display parameter of the main display panel based on the amplified signal; and an adjusting circuit, coupled to the signal processing circuit and configured to adjust the display parameter of the main display panel with the compensation display parameter.

In some embodiments, the temperature sensing circuit is further coupled to a gate line in the auxiliary display panel, and the temperature sensing circuit is configured to generate the temperature signal when the gate line provides a turn-on signal; and the control circuit further includes: a clock circuit configured to output a sampling clock signal, wherein a sampling period of the sampling clock signal is an integral multiple of a scanning period, and a duration of the scanning period is a duration required to scan gate lines in the auxiliary display panel; and a sample and hold circuit coupled to the clock circuit, wherein the sample and hold circuit is configured to acquire a sampled signal by sampling the amplified signal when the sampling clock signal is at a first level, and stop sampling and keep outputting the sampled signal to the signal processing circuit when the sampling clock signal is at a second level.

In some embodiments, the clock circuit is a counter and the counter is configured to: count active levels of a scanning clock signal that scans the auxiliary display panel, output the sampling clock signal of the second level when the count value is less than a threshold, and output the sampling clock signal of the first level and clear the count value when the count value is equal to the threshold, wherein the threshold is an integral multiple of a total number of the gate lines.

In some embodiments, the display module further includes a storage circuit configured to store a compensation display parameter lookup table, wherein the compensation display parameter lookup table stores a corresponding relationship between a signal value of the temperature signal and the compensation display parameter; and the control circuit is coupled to the storage circuit and is configured to: acquire the compensation display parameter of the main display panel by searching the compensation display parameter lookup table based on the signal value of the temperature signal.

In some embodiments, the display module includes a plurality of temperature sensing circuits, wherein the control circuit is configured to: determine an average value of signal values of the temperature signals generated by the plurality of temperature sensing circuits; and acquire the compensation display parameter of the main display panel by searching the compensation display parameter lookup table based on the average value of the signal values.

In some embodiments, the display module includes a plurality of temperature sensing circuits, wherein the control circuit is configured to: acquire a pre-compensation parameter corresponding to each of the temperature sensing circuits by searching the compensation display parameter lookup table based on the temperature signal generated by each of the temperature sensing circuits; acquire the compensation display parameter of the main display panel based on the pre-compensation parameter corresponding to each of temperature sensing circuits and a position of each of the temperature sensing circuits, wherein the main display panel includes a plurality of compensation regions, and the compensation display parameter includes a compensation value of each of the compensation regions; and compensate for a display parameter of each compensation region with the compensation value of the compensation region, wherein a projection of each of the temperature sensing circuits on the main display panel is within one of the compensation regions.

In some embodiments, the temperature sensing circuit is further coupled to an input signal line, a gate line and an output signal line; and the temperature sensing circuit is configured to: generate, based on the temperature of the auxiliary display panel, the temperature signal related to the temperature and transmit the temperature signal to the control circuit through the output signal line, under the drive of a driving signal provided by the input signal line when the gate line provides a turn-on signal.

In some embodiments, the auxiliary display panel includes a plurality of dimmers arranged in an array, and the display module includes a plurality of temperature sensing circuits arranged in an array in the auxiliary display panel, wherein each temperature sensing circuit and at least one dimmer which are disposed in the same row are coupled to the same gate line, and the temperature sensing circuits in the same column are coupled to the same input signal line.

In some embodiments, the control circuit includes a plurality of chip-on films spaced from each other in the auxiliary display panel, a region where the temperature sensing circuit is disposed is intersected with a target extending line, the target extending line is an extending line of a center line of a spacing region between adjacent chip-on films in a display region, and the input signal line and/or the output signal line coupled to the temperature sensing circuit is a dummy lead of the chip-on film.

In a second aspect of the present disclosure, a display method applicable to the display module in the first aspect is provided. The method includes: acquiring a temperature signal related to temperature of the auxiliary display panel, wherein the temperature signal is generated by the temperature sensing circuit based on temperature of the auxiliary display panel; and adjusting a display parameter of the main display panel based on the temperature signal.

In some embodiments, adjusting the display parameter of the main display panel based on the temperature signal includes: determining a compensation display parameter of the main display panel based on the temperature signal; and adjusting the display parameter of the main display panel with the compensation display parameter.

In some embodiments, the temperature sensing circuit is further coupled to a gate line in the auxiliary display panel, and the temperature sensing circuit is configured to generate the temperature signal when the gate line provides a turn-on signal; and determining the compensation display parameter of the main display panel based on the temperature signal includes: acquiring an amplified signal by amplifying the temperature signal; acquiring a sampled signal by sampling the amplified signal according to a sampling period; and determining the compensation display parameter of the main display panel based on the sampled signal, wherein the sampling period is an integral multiple of a scanning period, and a duration of the scanning period is a duration required to scan gate lines in the auxiliary display panel.

In some embodiments, the display module includes a plurality of temperature sensing circuits; and determining the compensation display parameter of the main display panel based on the temperature signal includes: determining an average value of signal values of the temperature signals generated by the plurality of temperature sensing circuits; and acquiring the compensation display parameter of the main display panel by searching a compensation display parameter lookup table based on the average value of the signal values, wherein the compensation display parameter lookup table stores a corresponding relationship between the signal value of the temperature signal and the compensation display parameter.

In some embodiments, the display module includes a plurality of temperature sensing circuits; determining the compensation display parameter of the main display panel based on the temperature signal includes: acquiring a pre-compensation display parameter corresponding to each of the temperature sensing circuits by searching a compensation display parameter lookup table based on the temperature signal generated by each of the temperature sensing circuits; and acquiring the compensation display parameter of the main display panel based on the pre-compensation parameter corresponding to each of temperature sensing circuits and a position of each of the temperature sensing circuits, wherein the main display panel includes a plurality of compensation regions, the compensation display parameter includes a compensation value of each of the compensation regions, and a projection of each of the temperature sensing circuits on the main display panel is within one of the compensation regions; and adjusting the display parameter of the main display panel with the compensation display parameter includes: compensating for a display parameter of each compensation region with the compensation value of the compensation region.

In some embodiments, acquiring the compensation display parameter of the main display panel based on the pre-compensation parameter corresponding to each of temperature sensing circuits and the position of each of the temperature sensing circuits includes: acquiring the compensation display parameter of the main display panel by performing function fitting on the pre-compensation parameter corresponding to each of temperature sensing circuits and the position of each of temperature sensing circuits by using a binary quadratic polynomial.

In a third aspect of the present disclosure, a display device is provided. The display device includes a power supply component and the display module described in the first aspect.

BRIEF DESCRIPTION OF THE DRAWINGS

To describe the technical solutions in the present disclosure or prior art more clearly, the following briefly introduces the accompanying drawings required for describing the embodiments or prior art. Apparently, the accompanying drawings in the following description merely show the present disclosure, and persons of ordinary skill in the art may still derive other drawings from these accompanying drawings without creative efforts.

DETAILED DESCRIPTION

Figure 1A:
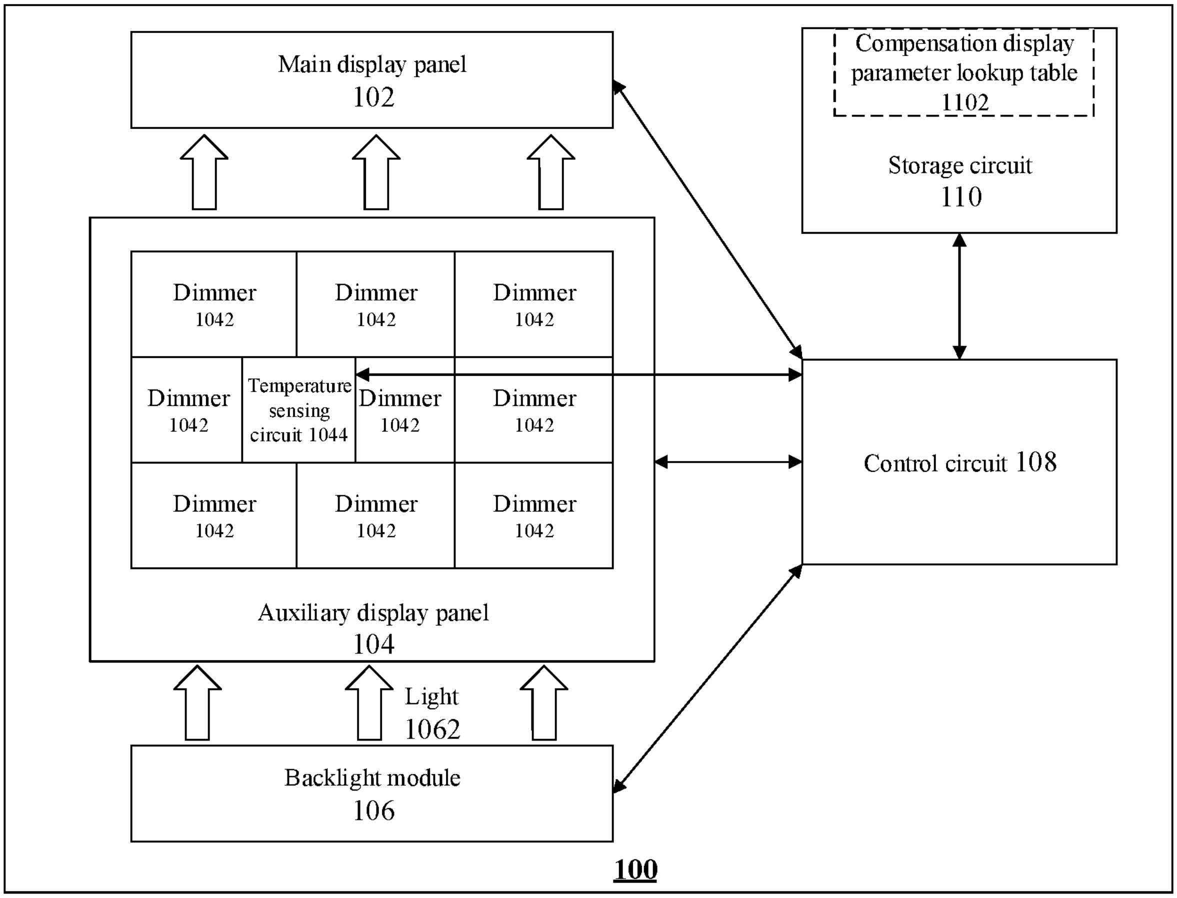
FIG. 1A shows a schematic diagram of a modular structure of a display module according to an embodiment of the present disclosure.

For clearer descriptions of the objects, technical solutions and advantages in the present disclosure, the present disclosure is descried in further detail below in combination with the specific embodiments and with reference to the accompanying drawings.

It should be noted that unless defined otherwise, technical terms or scientific terms used in the present disclosure should have the general meaning understood by persons of ordinal skill in the art. The terms "first", "second" and similar terms used in the present disclosure do not denote any order, quantity, or importance, and are merely used to distinguish different components. The word "comprise" or "include" and similar terms mean that the element or object appearing before the term covers the listed elements or objects and its equivalents appearing after the term while other elements or objects are not excluded. The term "connected" or "coupled" and similar terms are not limited to physical or mechanical connection, and may include electrical connection which is direct or indirect. The terms "upper", "lower", "left", "right" and the like are merely used to denote a relative position relationship. If an absolute position of the described object changes, the relative position relationship may also change accordingly.

In ultra-high-resolution and ultra-high contrast liquid crystal display devices that use the dual-cell technology, measures such as sacrificing the transmittance and aperture ratio are usually taken to acquire a good display effect. As the transmittance and aperture ratio decreases, a backlight module with ultra-high-brightness is generally used in the display device to ensure the display brightness. However, the problems such as power increase and high temperature rise usually occur in the backlight modules with ultra-high-brightness. For the display device adopting the dual-cell screen technology (referred to as dual-cell display device hereinafter), in order to satisfy the requirement for display brightness, the brightness of the backlight module may reach 100000 nits, the power of the backlight module may exceed 300 W and the power density of the backlight module may reach 1000 W/m$^2$.

Although designers may take heat dissipation measures, such as forced convection, for the backlight module, factors such as structure complexity of the backlight module and heat source distribution easily cause that the thermal resistance and thermal power of a system fail to match with each other, and the temperature at the surface of the screen (i.e., the surface of the display panel) may still easily exceed 50° C. If the backlight module is in a high-temperature state for a long time, the liquid crystal characteristics of the display panel and the color resistance characteristics of the color film may change, which in turn causes the degradation the picture display quality. The color resistance characteristic of the color film refers to the characteristic in absorption of light of different wavelengths by the color film.

The degradation of display quality caused by high temperature may be caused by chromaticity coordinate offset. The chromaticity coordinate offset results in the phenomenon of color point drift in a displayed picture. The junction temperature of a light source (generally, an LED) in the backlight module of the dual-cell display device may exceed 100° C., and the temperature on the surface of the display screen may exceed 50° C. At such high temperatures, the liquid crystal characteristics and the color resistance characteristics of the color film easily changes, which results in the phenomenon of color point shift in the displayed picture.

As a method for improving the display quality that degrades due to temperature rise, chromaticity coordinate compensation is simple to implement and low in cost. A chromaticity coordinate compensation solution includes: calibrating a color point of the display panel in the dual-cell display device in a stable state and presetting a compensation value of a fixed value in a system. In the working process of the dual-cell display device, chromaticity coordinates of the display panel are compensated with this compensation value. However, the above chromaticity coordinate compensation solution has certain limitations. Firstly, this compensation is only suitable for the situation that the temperature of the dual-cell display device in the stable state is known, and the compensation data does not need to be dynamically adjusted. Secondly, since the temperature of the display panel is variable in the process that the dual-cell display device enters the stable state from being turned on, and thus viewers can still perceive the gradual change or step change of the picture during the process. Based on the above analysis, it can be known that the above chromaticity coordinate compensation solution cannot satisfy the demands for high-performance displays.

The embodiments of the present disclosure provide a display module and a display method thereof, and a display device. The display module includes a main display panel, an auxiliary display panel and a backlight module which are laminated sequentially. The main display panel is also referred to as a display liquid crystal panel, and may include a plurality of sub-pixels for display. The auxiliary display panel is also referred to as a dimming liquid crystal panel, and is disposed between the main display panel and the backlight module and may include a plurality of dimmers. The plurality of dimmers are disposed in correspondence with the plurality of sub-pixels and are configured to adjust the transmittance of emergent light from the backlight module when the emergent light passes through the dimmers. The display module further includes a control circuit and at least one temperature sensing circuit disposed in the auxiliary display panel. The temperature sensing circuit is configured to generate, based on the temperature of the auxiliary display panel, a temperature signal related to the temperature. The control circuit is configured to adjust a display parameter of the main display panel based on the temperature signal.

According to the display module and the display method thereof and the display device according to the present disclosure, the temperature sensing circuit disposed in the auxiliary display panel can detect the temperature of the auxiliary display panel and generate the temperature signal related to the temperature, such that the control circuit can adjust the display parameter (such as chromaticity coordinates) of the main display panel based on the temperature signal, thereby improving the quality of the displayed picture.

Figure 1B:
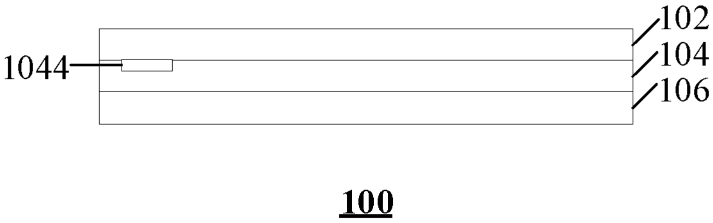
FIG. 1B shows a schematic diagram of a laminated structure of a display module according to an embodiment of the present disclosure.

FIG. 1A shows a schematic diagram of a modular structure of a display module according to an embodiment of the present disclosure. As shown in FIG. 1A, the display module 100 includes a main display panel 102, an auxiliary display panel 104, a backlight module 106, a control circuit 108 and a storage circuit 110. FIG. 1B shows a schematic diagram of a laminated structure of the display module according to an embodiment of the present disclosure. As shown in FIG. 1B, the main display panel 102, the auxiliary display panel 104 and the backlight module 106 are laminated sequentially.

The main display panel 102 may include a plurality of sub-pixels for display, such as a red sub-pixel, a green sub-pixel, and a blue sub-pixel.

The backlight module 106 may generate planar emergent light 1062 based on light emitted from a backlight source, and emit the emergent light 1062 to the auxiliary display panel 104.

The auxiliary display panel 104 is disposed between the main display panel 102 and the backlight module 106 and may include a plurality of dimmers 1042. The plurality of dimmers 1042 are disposed in correspondence with the plurality of sub-pixels in the main display panel 102 and are configured to adjust the transmittance of the emergent light 1062 from the backlight module 106 when the emergent light 1062 passes through the dimmers 1042. In some embodiments, the plurality of dimmers 1042 may be in one-to-one correspondence with the plurality of sub-pixels. Alternatively, each dimmer 1042 may correspond to a plurality of sub-pixels, and the orthographic projections of the plurality of sub-pixels on the auxiliary display panel 104 are in the region where the corresponding dimmer 1042 is disposed.

As shown in FIG. 1A, the display module 100 further includes at least one temperature sensing circuit 1044 in the auxiliary display panel 104, and a control circuit 108 coupled to the at least one temperature sensing circuit 1044. The temperature sensing circuit 1044 is configured to generate, based on the temperature (or a temperature change) of the auxiliary display panel 104, a temperature signal (such as an electrical signal) related to the temperature. The control circuit 108 is configured to adjust the display parameter of the main display panel 102 based on the temperature signal.

By disposing at least one temperature sensing circuit 1044 in the auxiliary display panel 104 to detect the temperature (or the temperature change) of the auxiliary display panel 104 in real time and generate the temperature signal related to the temperature, the control circuit 108 may adjust the display parameter (such as the chromaticity coordinates) of the main display panel 102 based on the temperature signal, thereby improving the quality of the displayed picture.

In addition, the at least one temperature sensing circuit 1044 is disposed in the auxiliary display panel 104 and the auxiliary display panel 104 is disposed between the main display panel 102 and the backlight module 106. Thus, on the one hand, the at least one temperature sensing circuit 1044 disposed in the auxiliary display panel 104 is closer to the backlight module 106, which is equivalent to a heat source, than disposed in the main display panel 102. On the other hand, the at least one temperature sensing circuit 1044 disposed in the auxiliary display panel 104 is closer to the main display panel 102, which is affected by the temperature more obviously, than disposed in the backlight module 106. Based on the above analysis, it can be known that the temperature sensing circuit 1044 disposed in the auxiliary display panel 104 can effectively measure the temperature on the screen surface, thereby ensuring the picture quality.

In some embodiments, the control circuit 108 may determine a compensation display parameter of the main display panel 102 based on the temperature signal generated by the temperature sensing circuit 1044, and adjust the display parameter of the main display panel 102 with the compensation display parameter.

It can be understood that the temperature sensing element in the temperature sensing circuit 1044 may be any element that can sense temperature and generate a temperature signal related to the temperature. For example, the temperature sensing element in the temperature sensing circuit 1044 may be a temperature sensor, a thermocouple, a thermal resistor, a thermistor or the like. The display parameter may be a temperature-sensitive display parameter, such as chromaticity coordinates.

Figure 2A:
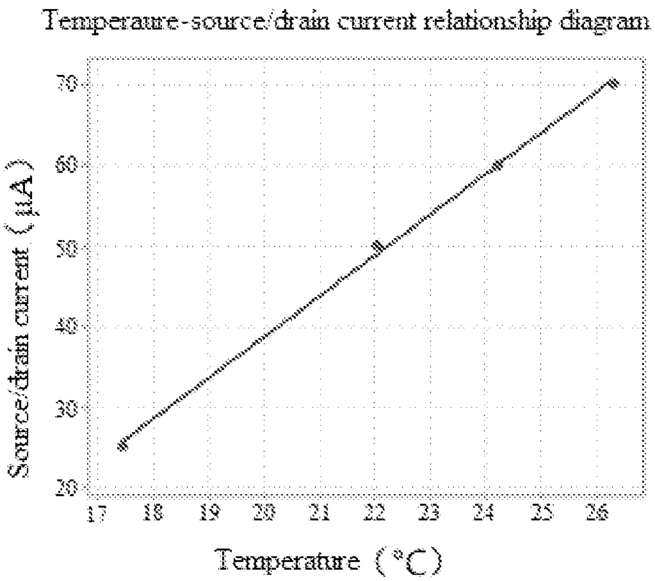
FIG. 2A shows a relationship between a source/drain current of a TFT and temperature.

By researching the temperature characteristics of a thin film transistor (TFT) after the screen is disassembled, it has been found that a source/drain current of the TFT is sensitive to temperature. As shown in FIG. 2A, the source/drain current of the TFT basically has a linear relationship with the temperature. In view of this, a temperature-sensing TFT may be disposed in the temperature sensing circuit 1044 and the temperature-sensing TFT is used to sense the temperature and generate the source/drain current related to the temperature. That is, the temperature signal generated by the temperature sensing circuit 1044 may be the source/drain current of the temperature-sensing TFT.

Since the source/drain current of the TFT basically has a linear relationship with the temperature and the electrical characteristic of the TFT provides convenience for temperature sensing, the TFT may be used as the temperature sensing element. In addition, since the auxiliary display panel 104 itself is of a TFT array structure without a color film structure, when the temperature-sensing TFT is added in the auxiliary display panel 104, no additional new material and new design are required and only a small number of TFTs in the auxiliary display panel 104 are employed as temperature-sensing TFTs. Therefore, it is less difficult to implement this solution.

Figure 2B:
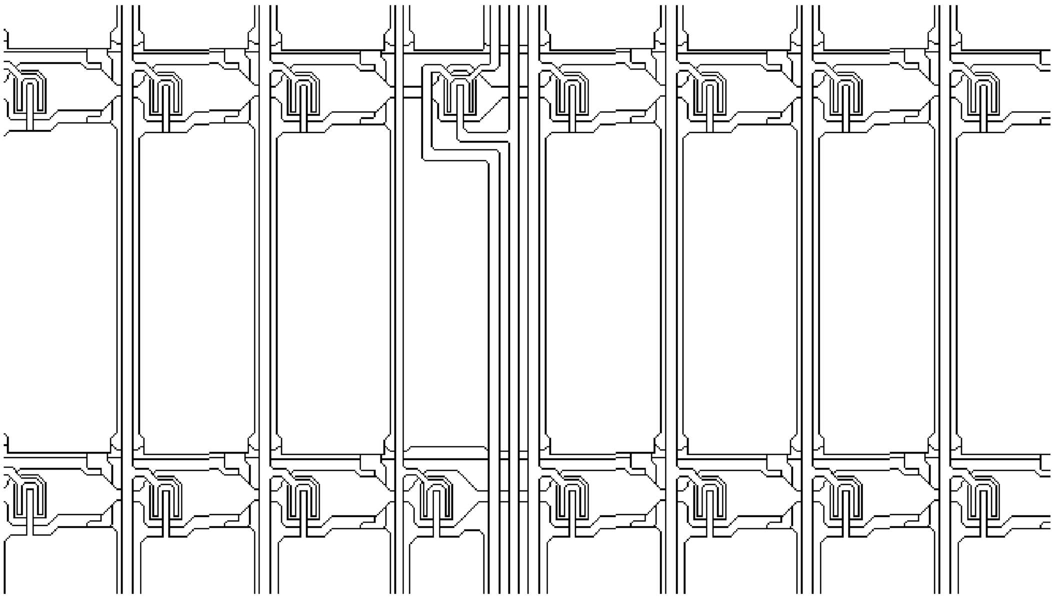
FIG. 2B shows a schematic diagram of the arrangement of TFTs in an auxiliary display panel according to an embodiment of the present disclosure.

FIG. 2B shows a schematic diagram of the arrangement of TFTs in an auxiliary display panel according to an embodiment of the present disclosure. As shown in FIG. 2B, the dimmer in the auxiliary display panel 104 includes an ordinary TFT 1046 (a TFT for dimming). The shape and an etched structure of the temperature sensing TFT 1048 may be basically the same as those of the ordinary TFT 1046. The size of the temperature sensing TFT 1048 may be adjusted based on different needs or actual effects. For example, one temperature sensing TFT 1048 may be formed in the region corresponding to three sub-pixels (DOT).

Figure 2C:
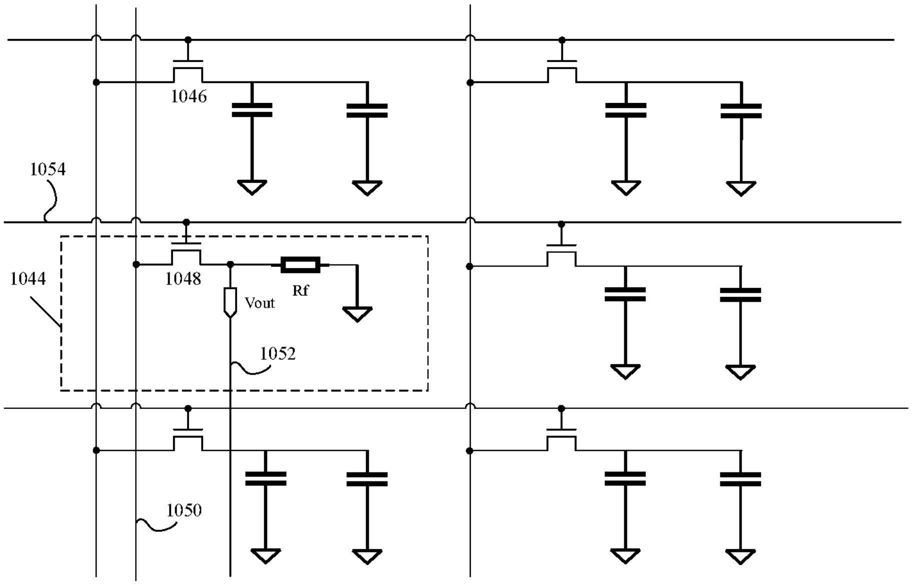
FIG. 2C shows a schematic diagram of the wiring of an exemplary circuit of an auxiliary display panel according to the embodiment of the present disclosure.

FIG. 2C shows a schematic diagram of an exemplary equivalent circuit of the auxiliary display panel 104*a* according to an embodiment of the present disclosure. As shown in FIG. 2C, each temperature sensing circuit 1044 is further coupled to an input signal line 1050, an output signal line 1052 and a gate line 1054. The output signal line 1052 is further coupled to the control circuit 108. The temperature sensing circuit 1044 is configured to: generate, based on the temperature of the auxiliary display panel 104, the temperature signal related to the temperature and transmit the temperature signal to the control circuit 108 through the output signal line 1052, under the drive of a driving signal provided by the input signal line 1050 when the gate line 1054 provides a turn-on signal. For example, when the gate line 1054 provides the turn-on signal, the temperature sensing TFT 1048 in the temperature sensing circuit 1044 may be turned on. The temperature sensing TFT 1048 may then transmit the temperature signal (such as the source/drain current) to the output signal line 1052 under the drive of the driving signal provided by the input signal line 1050.

Figure 2D:
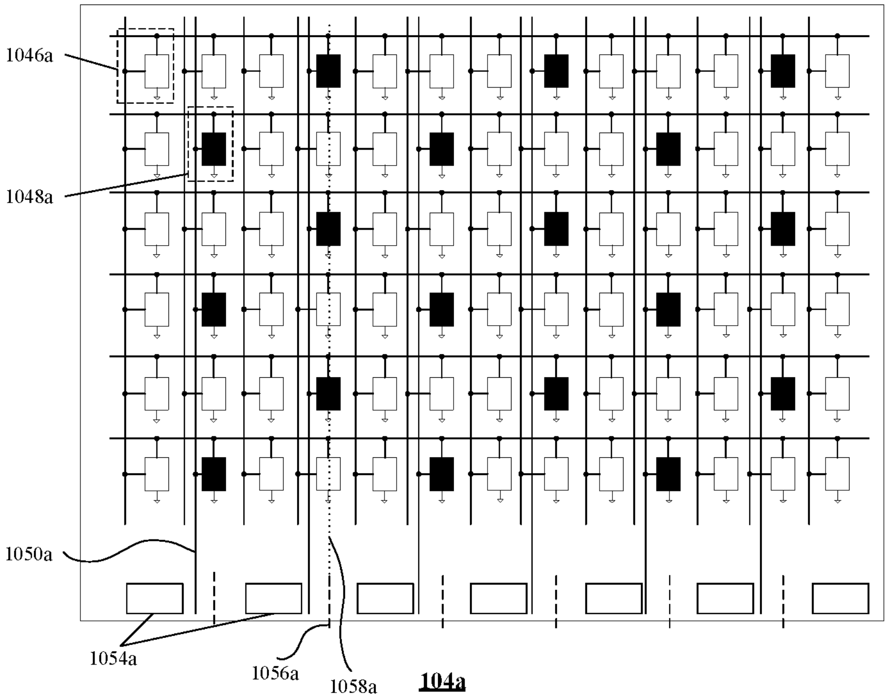
FIG. 2D shows a schematic diagram of the wiring of another exemplary circuit of an auxiliary display panel according to the embodiment of the present disclosure.

FIG. 2D shows a schematic diagram of the wiring of an exemplary circuit of the auxiliary display panel 104*a* according to an embodiment of the present disclosure. In some embodiments, there are a plurality of temperature sensing circuit 1044 (such as the temperature sensing TFTs 1048) and the temperature sensing circuits 1044 are arranged in an array in the auxiliary display panel 104. In this way, by collecting the temperature signals of the plurality of temperature sensing circuits 1044 for sensing the temperature which are distributed in the auxiliary display panel 104, the temperature distribution of the auxiliary display panel 104 may be acquired and thus the display parameter may be adjusted better.

As shown in FIG. 2D, in some embodiments, in order to simplify the wiring of the auxiliary display panel 104 while ensuring the aperture ratio of the auxiliary display panel 104, the temperature sensing circuit 1044 and the at least one dimmer which are disposed in the same row may be coupled to the same gate line. That is, the gate of the temperature sensing TFT 1048 may be coupled to the gate line of the ordinary TFT 1046 (which is also referred to as a driving transistor), such that the temperature sensing TFT 1048 shares a scanning signal with the ordinary TFT. The shared scanning signal may simultaneously control the ordinary TFT 1046 and the temperature sensing TFT 1048 to turn on or turn off.

In some embodiments, as shown in FIG. 2D, to ensure that the drain voltage of the temperature sensing TFT 1048*a* is a constant value, the temperature sensing circuits 1044 (such as the temperature sensing TFTs 1048*a*) in the same column may share the input signal line (such as the signal line 1050*a*), and the input signal line 1050*a* is independent of the input signal line of the ordinary TFT 1046*a*. Compared with the existing ordinary TFT 1046*a*, only one input signal line needs to be added for the temperature sensing TFTs 1048*a* in the same column. Thus, the traces of the plurality of thin-film transistors for sensing the temperature can be saved and the wiring of a circuit board can be simplified.

Figure 2E:
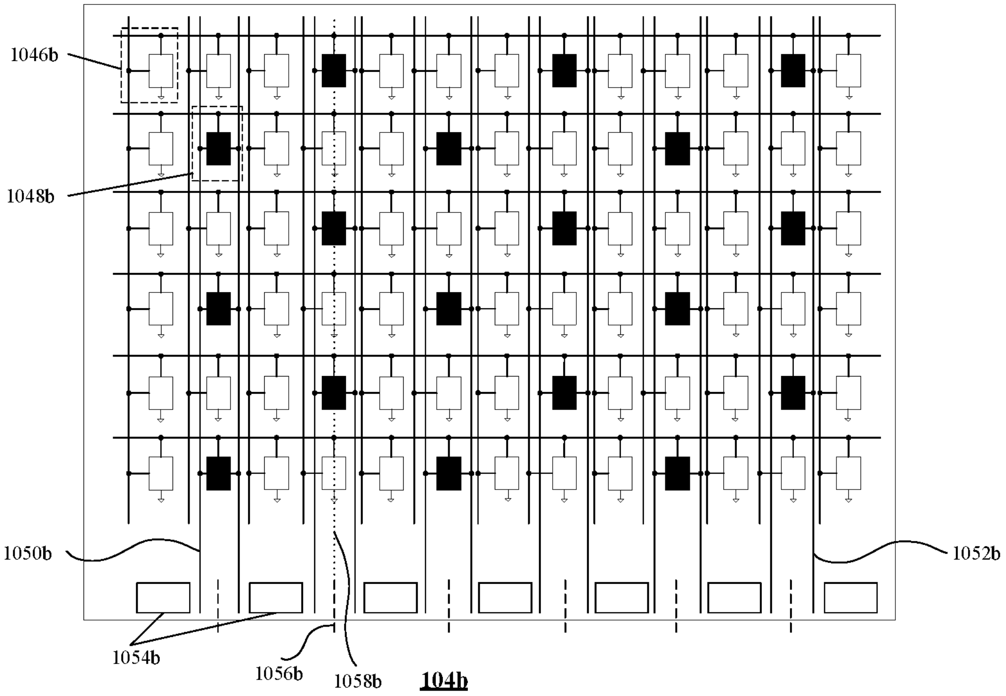
FIG. 2E shows a schematic diagram of an exemplary equivalent circuit of an auxiliary display panel according to the embodiment of the present disclosure.

FIG. 2E shows a schematic diagram of the wiring of an exemplary circuit of the auxiliary display panel 104*b* according to an embodiment of the present disclosure. As shown in FIG. 2E, in some embodiments, the temperature sensing circuits 1044 (such as temperature sensing TFTs 1048*b*) in the same column may not only share the input signal line (such as the signal line 1050*b*), but also may share the output signal line (such as the signal line 1052*b*). Compared with the existing ordinary TFT (such as the TFT 1046*b*), only one output signal line needs to be added for the temperature sensing TFTs 1048*b* in the same column. Thus, the traces of the plurality of thin-film transistors for sensing the temperature can be saved and the wiring of the circuit board can be simplified.

It should be noted that in the case where the temperature sensing TFTs 1048*b* in the same column share the output signal line, in order to ensure that the temperature signals are read in order, the output signal line needs to operate in a time-division multiplexing manner, so as to read the temperature signals output by the temperature sensing TFTs 1048*b* at different positions by using different time nodes.

In some embodiments, as shown in FIG. 2D or 2E, the control circuit 108 may include a plurality of chip-on films (COFs) 1054*a* or 1054*b* which are disposed in the auxiliary display panel 104*a* or 104*b* and spaced from one another. The region where the temperature sensing circuit 104 (such as the temperature sensing TFT 1048*b*) is disposed is intersected with a target extending line, and the target extending line is an extending line (such as an extending line 1058*a* in FIG. 2D or an extending line 1058*b* in FIG. 2E) of a center line (such as a center line 1056*a* in FIG. 2D or a center line 1056*b* in FIG. 2E) of a spacing region between adjacent chip-on films in a display region. In addition, the input signal line (such as the signal line 1050*a* or 1050*b*) and/or the output signal line (such as the signal line 1052*b*) coupled to the temperature sensing circuit is a dummy lead of the chip-on film.

By disposing the temperature sensing circuit (such as the temperature sensing TFT) in the extending direction of the target extending line, the signal line (such as the signal line 1050*a* or 1050*b* in FIG. 2C or the signal line 1052*b* in FIG. 2D) coupled to the temperature sensing circuit may be closer to the dummy lead of the chip-on film. Therefore, when the dummy lead of the chip-on film is configured to form the input signal line and/or the output signal line of the temperature sensing circuit, the wiring may be better, thereby avoiding the problem of capacitance balance caused by an intersection between the input signal line and/or the output signal line of the temperature sensing circuit and the signal line of the ordinary TFT. With such a design, it may also be ensured that the improvement of the present disclosure affects less on the circuit wiring of the auxiliary display panel 104.

As shown in FIG. 2C, in some embodiments, the temperature sensing circuit 1044 may further include a sampling resistor Rf, and the sampling resistor Rf is connected in series between the temperature sensing TFT 1048 and a reference voltage terminal (such as a ground terminal). The sampling resistor Rf is configured to pull up the potential of the source of the temperature sensing TFT 1048, so that a node voltage Vout of a connection node between the sampling resistor Rf and the temperature sensing TFT 1048 is associated with the source/drain current of the temperature sensing TFT 1048. The node voltage Vout of the connection node may then be used as the temperature signal.

Based on FIGS. 2C to 2E, it can be known that one input signal line and one output signal line need to be added additionally for one column of temperature sensing TFTs, compared with an ordinary TFT array in the auxiliary display panel 104. However, as the auxiliary display panel 104 is not a main panel that provides visual stimulation, addition of few traces in auxiliary display panel 104 has less effect on the picture display effect.

Figure 2F:
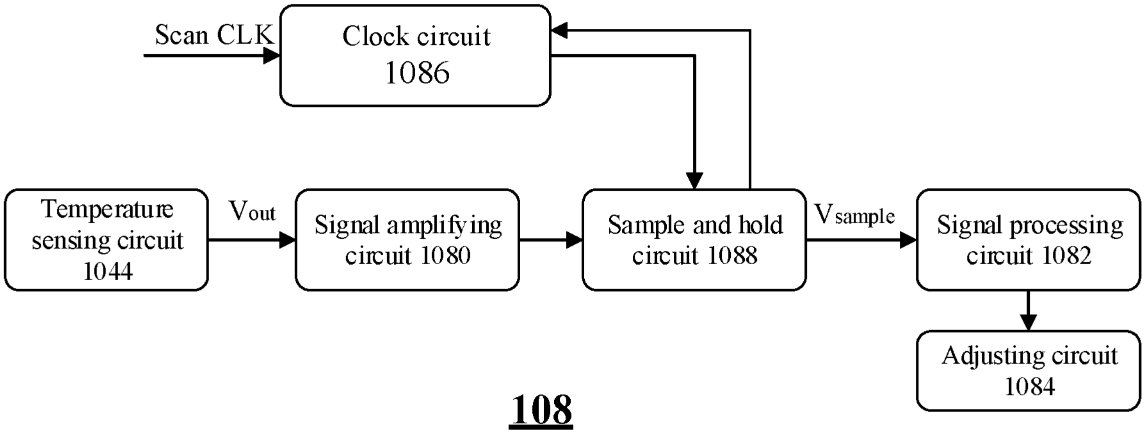
FIG. 2F shows a schematic diagram of a circuit structure of an exemplary control circuit according to an embodiment of the present disclosure.

FIG. 2F shows a schematic diagram of a circuit structure of an exemplary control circuit according to an embodiment of the present disclosure. For the demand of detecting the reliability of a voltage signal, as shown in FIG. 2F, the control circuit 108 may include a signal amplifying circuit 1080, a signal processing circuit 1082 and an adjusting circuit 1084.

The signal amplifying circuit 1080 is coupled to the temperature sensing circuit 1044. For example, the signal amplifying circuit 1080 may be electrically coupled to the connection node between the sampling resistor Rf and the temperature sensing TFT 1048. The signal amplifying circuit 1080 is configured to amplify the temperature signal (such as the node voltage Vout), to acquire an amplified signal which is easy to recognize and has a high load capability. In some embodiments, the signal amplifying circuit 1080 may be a voltage follower.

The signal processing circuit 1082 is coupled to the signal amplifying circuit 1080. The signal processing circuit 1082 is configured to determine a compensation display parameter of the main display panel 102 based on the amplified signal.

The adjusting circuit 1084 is coupled to the signal processing circuit 1082. The adjusting circuit 1084 is configured to adjust the display parameter of the main display panel 102 with the compensation display parameter. In some embodiments, the adjusting circuit 1084 may be a timing controller (TCON).

As described above, the temperature sensing circuit 1044 is further coupled to one gate line in the auxiliary display panel 104, and the temperature sensing circuit 1044 is configured to generate the temperature signal when the gate line provides a turn-on signal. Correspondingly, with reference to FIG. 2F, the control circuit 108 may further include a clock circuit 1086 and a sample and hold circuit 1086.

The clock circuit 1086 is configured to output a sampling clock signal. The sampling period of the sampling clock signal is an integral multiple of a scanning period, and the duration of the scanning period is a duration required to scan respective gate lines in the auxiliary display panel 104.

The sample and hold circuit 1088 is coupled to the clock circuit 1086 and the sample and hold circuit 1088 is configured to acquire a sampled signal Vsample by sampling the amplified signal when a level of the sampling clock signal is a first level, and stop sampling and keep outputting the sampled signal Vsample to the signal processing circuit 1082 when the level of the sampling clock signal is a second level. The first level may be a high level relative to the second level.

In the embodiment of the present disclosure, the scanning period is a duration required to scan one frame of image. If the scanning frequency of scanning the respective gate lines in the auxiliary display panel 104 is f and the total number of the gate lines to be scanned in the auxiliary display panel 104 is N (that is, the number of scanning lines is N), the sampling period T may satisfy $T=(N/f)*k$, where k is a positive integer and N/f is the scanning period.

If k=1, the sampling period is equal to the scanning period. Correspondingly, for each temperature sensing circuit 1044, the control circuit 108 may sample the temperature signal generated by the temperature sensing circuit 1044 once in each scanning period. If k is greater than 1, the sampling period is a multiple of the scanning period. Correspondingly, for each temperature sensing circuit 1044, the control circuit 108 may sample the temperature signal generated by the temperature sensing circuit 1044 once every other k−1 scanning period.

It should be understood that the sampling clock signal output from the clock circuit 1086 is a square signal, and the period of the square signal is the sampling period. That is, the level of the sampling clock signal jumps from the second level to the first level every other sampling period. Thus, the sample and hold circuit 1088 may sample the amplified signal once every other sampling period. Since the respective gate lines in the auxiliary display panel 104 are scanned line by line and the temperature sensing circuit 1044 can output the temperature signal only when the gate line to which the temperature sensing circuit 1044 is coupled is scanned (that is, when the gate line provides a turn-on signal), to avoid an invalid signal to be sampled, the sample and hold circuit 1088 may stop sampling after one sampling is completed and hold the sampled signal Vsample until the next sampling period.

In some embodiments, the clock circuit 1086 is a counter and the counter is configured to: count active levels of a scanning clock signal Scan CLK that scans the auxiliary display panel 104, output the sampling clock signal of the second level when the count value is less than a threshold, and output the sampling clock signal of the first level and clear the count value when the count value is equal to the threshold.

The threshold is an integral multiple of the total number of the respective gate lines. The active level of the scanning clock signal may be a high level. For example, assuming that the sampling period is k times the scanning period and the total number of the gate lines to be scanned in the auxiliary display panel 104 is N, then the threshold is k*N. The counter may output the sampling clock signal of the first level when the count value reaches k*N, i.e., every other k scanning period. Afterwards, as the counter may clear the count value and count again, the counter may continue to output the sampling clock signal of the second level.

In some embodiments, the signal amplifying circuit 1080, the clock circuit 1086, and the sample and hold circuit 1088 may be disposed on a circuit board for transmitting signals. The circuit board may be a printed circuit board (PCB), such as a circuit board of a field programmable gate array (FPGA), and the clock circuit 1056 may be integrated in the FPGA.

After the sampled signal Vsample is acquired, the control circuit 108 may acquire the compensation display parameter (such as RGB compensation values) by searching a compensation display parameter lookup table, such as an adjust chromaticity coordinate table (ACC table) in the storage circuit 110 based on the sampled signal Vsample. Afterwards, the control circuit 108 may adjust the displayed picture by correspondingly compensating for the RGB parameters of the main display panel based on the acquired compensation display parameter.

In actual measurement, the sampled signal acquired by sampling the temperature signal generated by a single temperature sensing circuit 1044 (such as the temperature sensing TFT 1048) is a periodic square signal, and the sampled signal is held by the sample and hold circuit 1088 (for example, the sample and hold circuit 1088 may be a latch). Since the plurality of temperature sensing circuits 1044 disposed in the same column (such as the plurality of temperature sensing TFTs 1048 disposed in the same column) may be coupled to the same output signal line, the temperature signals generated by the plurality of temperature sensing circuits 1044 disposed in the same column may be acquired in a time-division multiplexing manner to reduce the traces in the board.

Figure 2G:
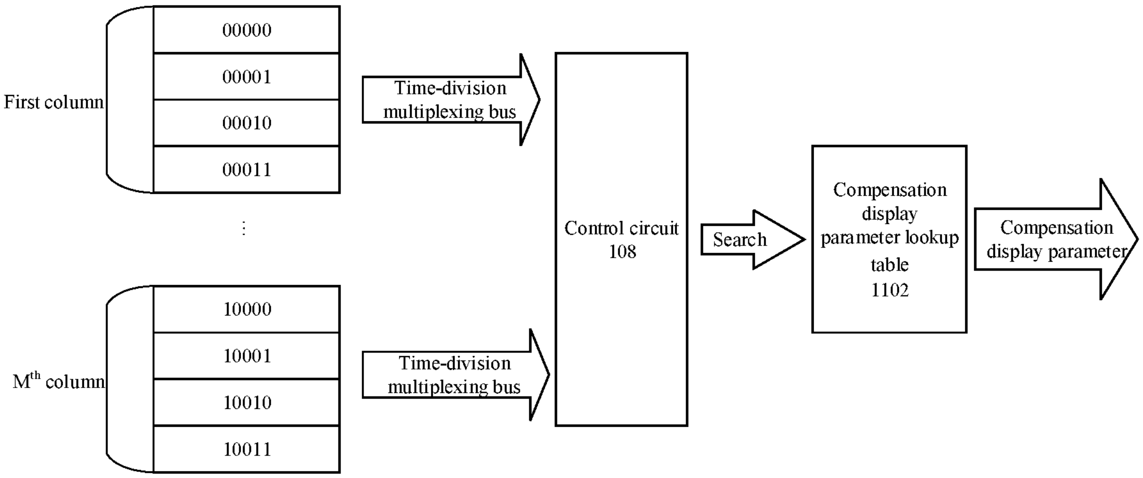
FIG. 2G shows a schematic diagram of acquiring a temperature signal in a time-division multiplexing manner according to an embodiment of the present disclosure.

FIG. 2G shows a schematic diagram of acquiring temperature signals in a time-division multiplexing manner according to an embodiment of the present disclosure. As shown in FIG. 2G, in some embodiments, the temperature signals collected by the temperature sensing TFTs 1048 disposed in an array may be transmitted to the control circuit 108 via time-division multiplexing buses. The temperature signals collected by each column of temperature sensing TFTs 1048 may be transmitted to the control circuit 108 in a time division manner via one time-division multiplexing bus (i.e., the output signal line). For example, the four temperature sensing TFTs 1048 disposed in the first column may transmit the collected temperature signals 00000, 00001, 00010, and 00011 to the control circuit 108 in a time-division manner. The control circuit 108 may determine the position of the corresponding temperature sensing TFT 1048 in the auxiliary display panel 104 based on a coded address of the temperature sensing TFT 1048.

Figure 2H:
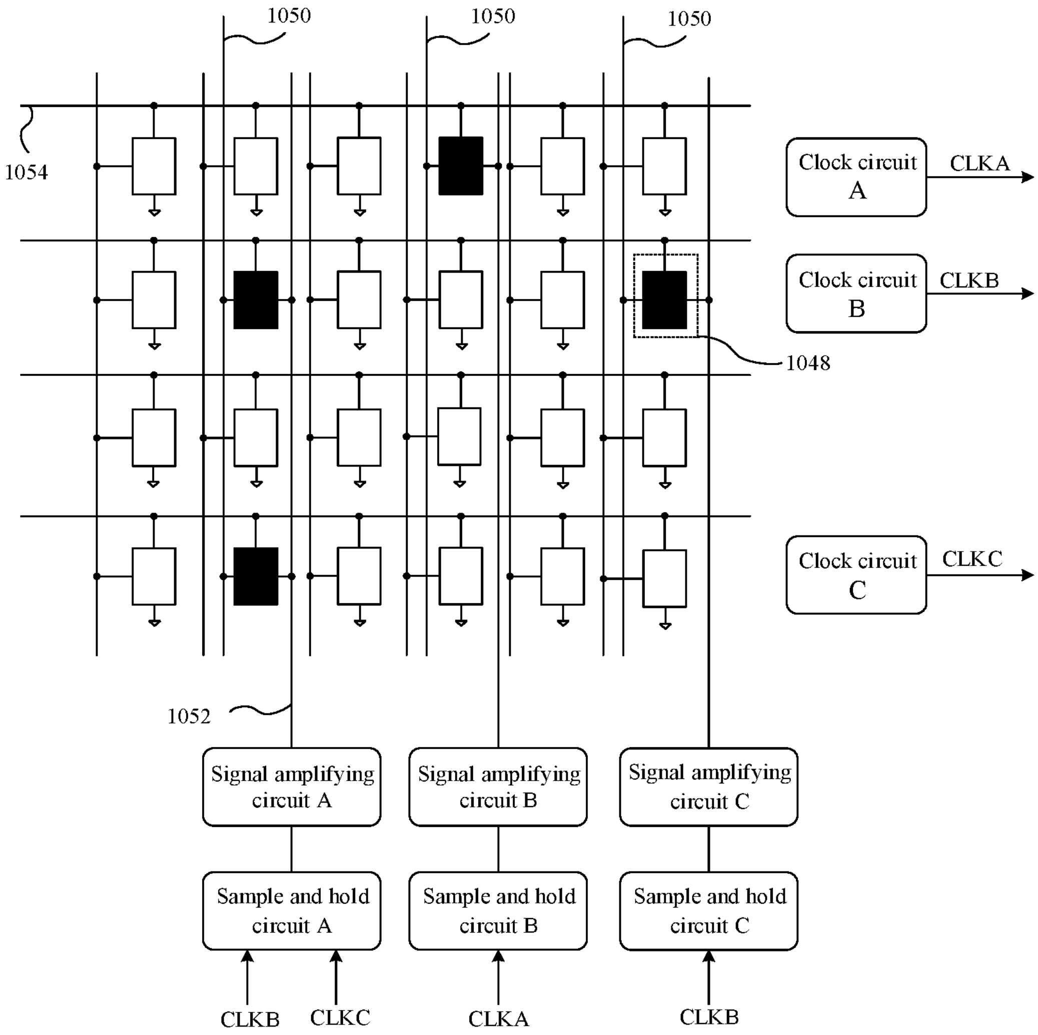
FIG. 2H is a schematic diagram of an exemplary equivalent circuit of a display module according to the embodiment of the present disclosure.

In some embodiments, in the scenario where the display module includes a plurality of output signal lines 1052 (that is, a plurality of columns of temperature sensing circuits 1044 are disposed in the auxiliary display panel 104), as shown in FIG. 2H, the control circuit 108 may include a plurality of signal amplifying circuits 1080 coupled in one-to-one correspondence to the plurality of output signal lines, and a plurality of sample and hold circuits 1088 coupled in one-to-one correspondence to the plurality of signal amplifying circuits 1080. Each signal amplifying circuit 1080 is configured to amplify the temperature signal transmitted in one output signal line 1052, and each sample and hold circuit 1088 is configured to sample the amplified signal output by one signal amplifying circuit 1080.

With continued reference to FIG. 2H, since the temperature sensing circuits 1044 in the same row are coupled to the same gate line 1054 and may simultaneously output the temperature signals under the drive of the same gate line 1054, the temperature sensing circuits 1044 in the same row may share the same clock circuit 1086. Correspondingly, the number of clock circuits 1086 in the control circuit 108 is equal to the number of rows of the temperature sensing circuits 1044. Each clock circuit 1086 is coupled to one or more sample and hold circuits 1088 coupled to the corresponding row of temperature sensing circuits 1044. In other words, each sample and hold circuit 1088 is coupled to one or more clock circuits 1086 corresponding to the column of temperature sensing circuits 1044 to which the sample and hold circuit 1088 is coupled. That is, each sample and hold circuit 1088 may work under the drive of the sampling clock signals provided by one or more clock circuits 1086.

Exemplarily, with reference to FIG. 2H, assuming that three rows and three columns of temperature sensing TFTs 1048 are disposed in the auxiliary display panel 104, then the control circuit 104 may include three clock circuits, i.e., clock circuit A to clock circuit C, corresponding to the three rows of temperature sensing TFTs 1048; three signal amplifying circuits, i.e., signal amplifying circuit A to signal amplifying circuit C, correspondingly coupled to the three columns of temperature sensing TFTs 1048; and three sample and hold circuits, i.e., sample and hold circuit A to sample and hold circuit C. The sample and hold circuit A is coupled to two temperature sensing TFTs 1048 in the same column. Since the two TFTs 1048 correspond to the clock circuit B and the clock circuit C respectively, the sample and hold circuit A may be coupled to the clock circuit B and the clock circuit C. The sample and hold circuit B is coupled to one temperature sensing TFT 1048. Since this TFT 1048 corresponds to the clock circuit A, the sample and hold circuit B may be coupled to clock circuit A. The sample and hold circuit C is also coupled to one temperature sensing TFT 1048. Since this TFT 1048 corresponds to clock circuit B, the sample and hold circuit C may be coupled to the clock circuit B.

It should be understood that since the temperature sensing circuits 1044 in different rows output the temperature signals at different times, times when the levels of the sampling clock signals output by different clock circuits 1086 are the first level are different. Based on this, the sample and hold circuit 1088 coupled to the plurality of temperature sensing circuits 1044 in the same column may collect the temperature signals generated by the plurality of temperature sensing circuits 1044 in a time-division manner, under the control of the plurality of sampling clock signals.

It should further be understood that the periods (i.e., the sampling period) of the sampling clock signals output by different clock circuits 1086 may be the same.

In the scenario where the display module 100 includes a plurality of temperature sensing circuits 1044, as a possible implementation, the control circuit 108 is configured to determine an average value of signal values of the temperature signals generated by the plurality of temperature sensing circuits 1044; and acquire the compensation display parameter of the main display panel by searching the compensation display parameter lookup table based on the average value of the signal values.

The average value of the signal values of the temperature signals may be a weighted average value. In this implementation, the control circuit 108 can calculate one compensation display parameter based on the collected temperature signals generated by the plurality of temperature sensing circuits 1044 and then compensate for the display parameter of the entire main display panel 102 with the compensation display parameter. In this implementation, the calculation complexity is low, and the compensation efficiency is high.

In the scenario where the display module 100 includes a plurality of temperature sensing circuits 1044, as another possible implementation, the control circuit 108 is configured to: acquire a pre-compensation parameter corresponding to each temperature sensing circuit 1044 by searching the compensation display parameter lookup table based on the temperature signal generated by the temperature sensing circuit 1044; acquire the compensation display parameter of the main display panel 102 based on the pre-compensation parameter corresponding to each of the plurality of temperature sensing circuits 1044 and the position of each of the temperature sensing circuits 1044, wherein the main display panel 102 includes a plurality of compensation regions, and the compensation display parameter includes a compensation value of each the compensation region; and compensate for the display parameter of each compensation region with the compensation value of the compensation region, wherein a projection of each temperature sensing circuit 1044 on the main display panel 102 is within one compensation region.

In the above implementation, the control circuit 108 can calculate compensation values of the respective compensation regions in the main display panel 102 based on the positions of the respective temperature sensing circuits 1044 and the collected temperature signals of the plurality of temperature sensing circuits 1044, and then correspondingly compensate for the display parameters of the respective compensation regions in the main display panel 102 based on the calculated compensation values of the respective compensation regions. In this implementation mode, partition compensation of the display parameters can be implemented, the compensation accuracy is high, and the compensation effect is better.

In the display module provided in the embodiment of the present disclosure, by taking advantage of the change of the source/drain current of the TFT with temperature, the temperature sensing TFTs are distributed in an array in the auxiliary display panel, so that the temperatures at different points in the auxiliary display panel can be detected. The control circuit may then process the detected temperature signals and search the compensation display parameter lookup table, to acquire the compensation display parameter (i.e., the chromaticity coordinates of the main display panel). Afterwards, the control circuit may compensate for the display parameter of the main display panel with the compensation display parameter. Thus, the problems of chromaticity coordinate offset and image unevenness caused by temperature are effectively avoided. In the display module according to the embodiment of the present disclosure, the detected, amplified and calibrated source/drain electrical signal of the temperature sensing TFT may be used as a temperature control feedback signal of a display system, to implement closed-loop control on the display parameter of the main display panel.

In the display module according to the embodiment of the present disclosure, the TFT for sensing temperature is disposed on a glass substrate (which is also referred to as an open cell) of the auxiliary display panel and is close to the main display panel and a color film thereon. By adopting this way for measuring temperature, a system error chain is shorter, the measurement is more accurate, and the true current screen surface temperature can be reflected better. In addition, the auxiliary display panel (which is also referred to as a sub-cell) itself is of a TFT array structure without the color film, so no additional new material and new design solution are required when the solution in the embodiment of the present disclosure is adopted, and only a small number of transistors and COF dummy leads need to be employed as temperature-sensing components. Therefore, it is less difficult to implement this solution. Moreover, the distributed temperature sensing TFTs can accurately capture the screen surface temperature temperatures at different spatial positions, which provides convenience for local chromaticity coordinate compensation, and is especially suitable for application scenarios where the screen surface temperature is not uniform due to local dimming. Furthermore, the temperature data may be monitored in real time based on the use state, and the current RBG compensation value matching the temperature data can be determined by searching the ACC table, such that the chromaticity coordinates of the picture can be adjusted adaptively, and the display parameter is compensated dynamically.

Figure 3A:
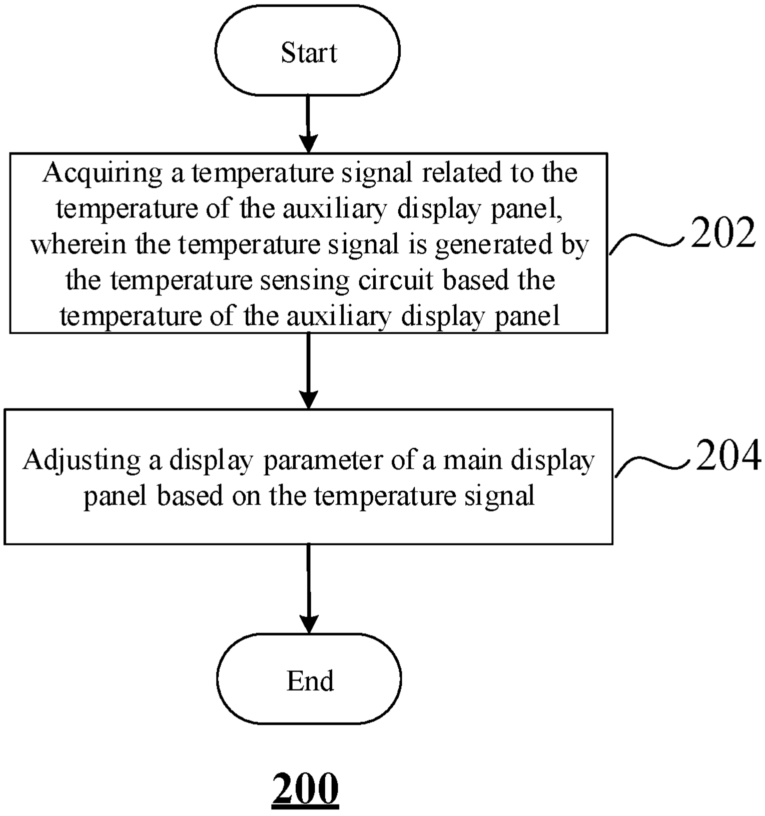
FIG. 3A shows a flowchart of an exemplary method according to an embodiment of the present disclosure.

FIG. 3A shows a flowchart of an exemplary method according to an embodiment of the present disclosure.

As shown in FIG. 3A, a display method 200 is applicable to any embodiment or a combination of the embodiments of the display module 100 above. The method 200 includes the following steps.

In step 202, a temperature signal related to the temperature of the auxiliary display panel is acquired, wherein the temperature signal is generated by the temperature sensing circuit based the temperature of the auxiliary display panel.

In some embodiments, the temperature sensing circuit (such as the temperature sensing circuit 1044 shown in FIG. 1A) disposed in the auxiliary display panel may include a thin film transistor for sensing temperature (such as the temperature sensing TFT 1048 shown in FIG. 2B). The temperature signal related to the temperature may be a source/drain current of the thin film transistor for sensing the temperature.

In step 204, a display parameter of the main display panel is adjusted based on the temperature signal.

In some embodiments, step 204 may further include: determining a compensation display parameter of the main display panel based on the temperature signal; and adjusting the display parameter of the main display panel with the compensation display parameter.

In some embodiments, the temperature sensing circuit further includes a sampling resistor (such as the sampling resistor Rf shown in FIG. 2E), and the sampling resistor is connected in series between the thin film transistor and a reference voltage terminal. A node voltage (such as the voltage Vout in FIG. 2E) between the sampling resistor and the thin film transistor is associated with the source/drain current. Correspondingly, the temperature signal may also be the node voltage.

In some embodiments, determining the compensation display parameter of the main display panel based on the temperature signal may further include: acquiring an amplified signal by amplifying the temperature signal (such as the voltage Vout in FIG. 2F); acquiring a sampled signal (such as the sampled signal Vsample in FIG. 2F) by sampling the amplified signal according to a sampling period; and determining the compensation display parameter of the main display panel based on the sampled signal.

The sampling period is an integral multiple of a scanning period, and the duration of the scanning period is the duration required to scan respective gate lines in the auxiliary display panel.

In the embodiment of the present disclosure, the scanning period is a period of a scanning clock signal (such as the scanning clock signal Scan CLK in FIG. 2F). When the compensation display parameter of the main display panel is determined, the compensation display parameter of the main display panel may be acquired by searching a compensation display parameter lookup table (such as a compensation display parameter lookup table 1102 in FIG. 2G) based on the sampled signal.

In some embodiments, the compensation display parameter may be RGB compensation parameters of chromaticity coordinates. It should be noted that the RGB compensation parameters here may be grayscale voltages for compensation for a red sub-pixel, a green sub-pixel and a blue sub-pixel respectively. As the gray-scale voltages are different, the brightness of the corresponding sub-pixels is different. By adjusting the brightness of the sub-pixels of different colors, the chromaticity coordinates can be adjusted.

In some embodiments, a plurality of temperature sensing circuits are provided and the plurality of temperature sensing circuits are disposed in an array in the auxiliary display panel. Step 202 may further include: for the temperature sensing circuits in the same column, the temperature signals generated by the respective temperature sensing circuits are acquired in a time-division multiplexing manner.

According to the needs of a project and the difficulty of implementation, temperature detection based on multi-point synchronous control of a plurality of temperature sensing circuits may be controlled in a partition mode and a non-partition mode. The temperature sensing circuit (such as, the temperature sensing TFT 1048*a* in FIG. 2D) distributed on the sub-cell (such as, the auxiliary display panel 104 in FIG. 1A) is configured to collect temperature signals at different positions. The number of temperature sensing circuits disposed in the auxiliary display panel may be determined based on the display size and the temperature field of the display module. For the convenience of describing an algorithm, the number of temperature sensing circuits disposed in the auxiliary display panel may be set as n, and all the temperature sensing circuits are numbered from 1 to n.

When the temperature signals generated by the temperature sensing circuits are sampled, the sampled signal acquired by sampling the temperature signal generated by the $i^{th}$ temperature sensing circuit at the sampling time t may be represented by x(i,t), where i is a positive integer not greater than n. This embodiment is described by taking an example in which the gate of the temperature sensing TFT in the temperature sensing circuit is controlled by a display scanning signal and the sampling period of the temperature signal is equal to the scanning period T. Therefore, the temperature on the surface of the display module should be jointly determined by the temperature signals generated by different temperature sensing TFTs in the same scanning period. The sampled signal acquired by sampling the temperature signal generated by the $i^{th}$ temperature sensing circuit in the scanning period T may be expressed as x(i,T).

Figure 3B:
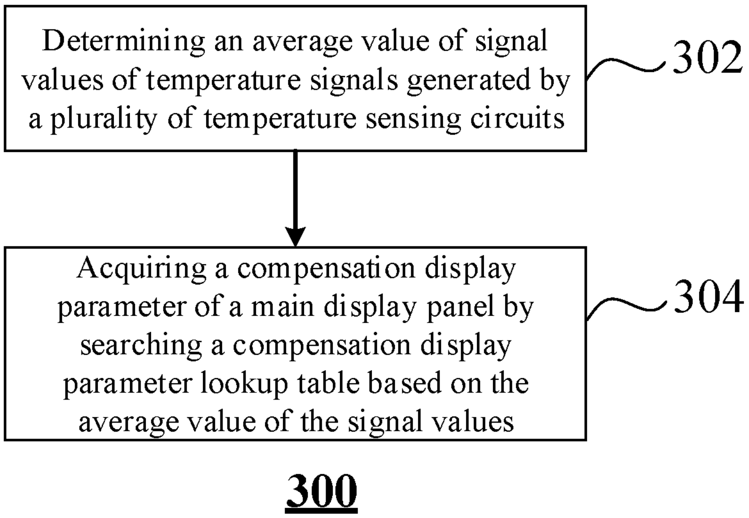
FIG. 3B shows a flowchart of another exemplary method according to an embodiment of the present disclosure.

FIG. 3B shows a flowchart of another exemplary method according to an embodiment of the present disclosure. As shown in FIG. 3B, in the embodiment of without adopting a partition compensation control, determining the compensation display parameter of the main display panel based on the temperature signal in step 300 may specifically include the following steps.

In step 302, an average value of signal values of temperature signals generated by a plurality of temperature sensing circuits is determined.

For example, a weighted average value of the sampled signals acquired by sampling the temperature signals generated by the plurality of temperature sensing circuits may be calculated.

In step 302, all the temperature sensing circuits may be traversed in the scanning period T, that is, sampled signals are acquired by sampling the temperature signals output by the temperature sensing circuits.

The temperature-related weighted average value X generated by performing weighted average on the sampled signals of n temperature sensing circuits collected in the scanning period T may satisfy:

$$X = \frac{1}{n}\sum_{i=1}^{n} k_i x(i, T),$$

where $k_i$ represents the weight of the sampled signal of the $i^{th}$ temperature sensing circuit in the n temperature sensing circuits. The weights of the sampled signals of the n temperature sensing circuits may be recorded in a weight table, and the weight table may be preset by a designer. It may be understood that setting modes of the weight may be different depending on different sizes of the display module. For example, when the size of the display module is smaller and the temperature distribution of the display module is relatively uniform, it may be set that $k_i=1$, (i=1, 2, . . . , n), which represents an average value of the n sampled signals. In the case that the temperature gradient of the screen surface is larger, the temperatures of respective parts of the display module during actual use may be measured first by developers, and then the weights of the sampled signal of the respective temperature sensing circuits are determined. For example, the weight of the sampled signal of the temperature sensing circuit corresponding to the part with a higher temperature may be greater.

In step 304, the compensation display parameter of the main display panel is acquired by searching a compensation display parameter lookup table based on the average value of the signal values.

The compensation display parameter lookup table (for example, the compensation display parameter lookup table 1102 in FIG. 2G) stores a corresponding relationship between the signal value of the temperature signal and the compensation display parameter. Afterwards, the signal processing circuit in the control circuit may output the compensation display parameter to the adjusting circuit, so that the adjusting circuit adjusts the chromaticity coordinate offset of the main display panel with the compensation display parameter.

Since the natural heat convection is manifested by heat conduction of a heat source at a lower place to form hot gas, the hot gas naturally rises and exchanges heat with cold gas at a high place, and the generated cold air naturally sinks and heat conduction occurs between the cold air and the heat source again. This circulation process is shown in a heat dissipation system of the display module as that the temperature gradient direction is the same as the gravity direction. Therefore, the temperature of the screen surface is not the same everywhere. If a single compensation value is used to compensate for the display parameter of the main display panel, the problem of poorer picture uniformity easily occurs.

In addition, the dual-cell technology uses the backlight module capable of realizing local dimming, the power consumption and heat amounts of different parts of the backlight module are different as the display picture changes. Especially when a dynamic picture is displayed, the display module cannot reach a stable state due to the local temperature rise, which may cause the problem of local color shift.

Figure 3C:
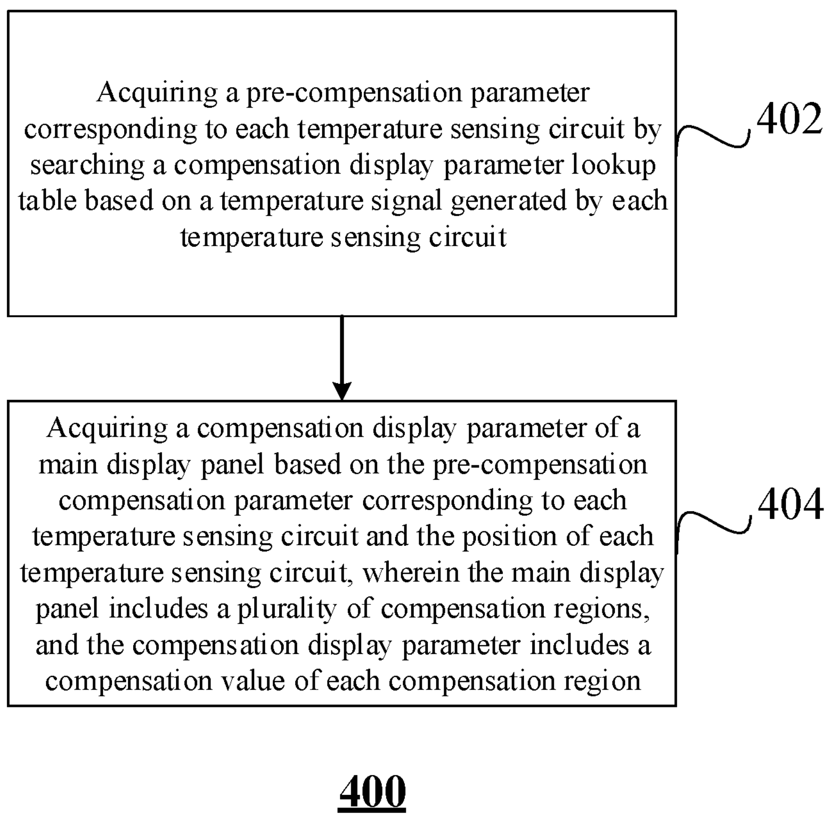
FIG. 3C shows a flowchart of still another method according to an embodiment of the present disclosure.

Therefore, in some embodiments, a partition compensation control method is adopted to compensate for the display parameter. FIG. 3C shows a flowchart of still another method according to an embodiment of the present disclosure. As shown in FIG. 3C, in a partition control embodiment, determining the compensation display parameter of the main display panel based on the temperature signal in step 400 may further include the following steps.

In step 402, a pre-compensation parameter corresponding to each temperature sensing circuit may be acquired by searching the compensation display parameter lookup table based on the temperature signal generated by each the temperature sensing circuit.

In step 404, the compensation display parameter of the main display panel is acquired based on the pre-compensation parameter corresponding to each temperature sensing circuit and the position of each temperature sensing circuit, wherein the main display panel includes a plurality of compensation regions, and the compensation display parameter includes a compensation value of each compensation region.

The projection of each temperature sensing circuit on the main display panel is within one compensation region.

Correspondingly, the process of adjusting the display parameter of the main display panel with the compensation display parameter may include: for each compensation region in the main display panel, the display parameter of the compensation region is compensated with the compensation value of the compensation region.

In some embodiments, the number of compensation regions may be equal to the number of temperature sensing circuits, that is, the main display panel may be divided into a plurality of compensation regions based on projections of the temperature sensing circuits on the main display panel. Each compensation region includes a plurality of sub-pixels.

In some other embodiments, the number of compensation regions may be greater than the number of temperature sensing circuits. For example, the number of compensation regions may be equal to the number of sub-pixels in the main display panel, that is, each compensation region may be one sub-pixel region. Accordingly, the compensation of the display parameters of the sub-pixel granularity may be achieved according to the method in the embodiment of the present disclosure. Alternatively, the number of compensation regions may be equal to the total number of the temperature sensing TFTs and ordinary TFTs in the auxiliary display panel, that is, each compensation region may be a projection region of one TFT on the main display panel.

In the case that the number of compensation regions is equal to the number of sub-pixels, or equal to the number of TFTs in the auxiliary display panel, the partition compensation control method may be a method of generating a compensation distribution map based on the sampled signal x(i, T) collected within the scanning period T. The compensation value of each compensation region in the main display panel is recorded in the compensation distribution map.

Figure 3D:
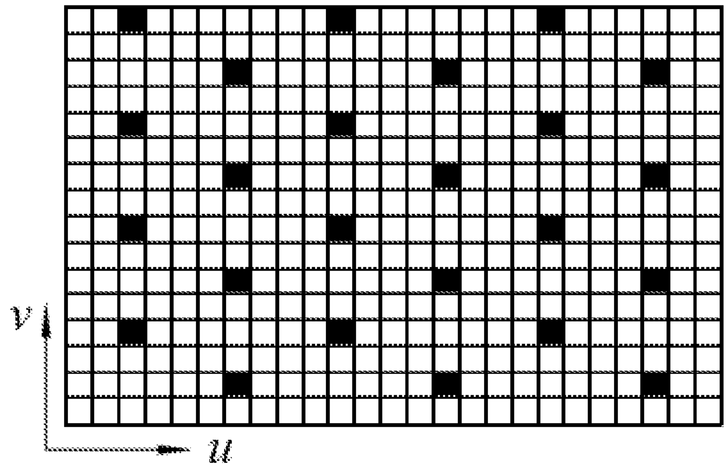
FIG. 3D shows a schematic diagram of an exemplary distribution of TFTs according to an embodiment of the present disclosure.

The following description is provided by taking an example in which the number of compensation regions is equal to the number of TFTs in the auxiliary display panel. In this embodiment, the temperature sensing circuits are distributed in a two-dimensional plane and their positions are known. Therefore, index (or number) codes of the temperature sensing circuits may be converted to coordinate values in a two-dimensional direction. FIG. 3D shows a schematic diagram of the exemplary distribution of TFTs according to an embodiment of the present disclosure. The TFTs in the auxiliary display panel may be arranged in an array along u and v directions. In addition, the black block in FIG. 3D represents the temperature sensing TFT in the temperature sensing circuit, and the white block represents the ordinary TFT in the dimmer. Correspondingly, the sampled signal acquired by sampling the temperature signal generated by the temperature sensing TFT with a coordinate value of (u,v) in the scanning period T may be expressed as x'(u,v,T). In this embodiment of the present disclosure, the temperature sensing TFTs are distributed in the auxiliary display panel 104, and thus all TFTs in the sub-cell may have corresponding coordinate codes.

It can be known from FIG. 3D that the number of temperature sensing circuits in the auxiliary display panel is less than the number of dimmers, that is, there is a limited number of temperature measuring points in the auxiliary display panel. To characterize the state of the temperature field of the entire display module with the limited temperature measuring points, temperatures of non-measuring points need to be acquired by calculation from the limited temperature measuring points. In combination with the coordinate codes assigned to the respective temperature sensing circuits and the sampled signals acquired by sampling the temperature signals generated by the respective temperature sensing circuits described above, the problem of acquiring the temperatures of the non-measuring points may be converted to the problem of two-dimensional curve fitting.

As the display module has a limited capability of data processing, the space and time of an algorithm for acquiring the temperature of the non-measuring point should not be too complicated. Based on the foregoing descriptions, it can be known that the temperature signal detected in this embodiment needs to be converted to a chromaticity coordinate compensation value.

If the temperature distribution data of the display module is acquired first by processing collected sampled signals and then a compensation value of each position (including positions of the temperature sensing TFTs and the ordinary TFTs) in the plane of the display module is determined based on the temperature distribution, the compensation value of each position needs to be calculated separately. For example, the compensation value of the sub-pixel at the position corresponding to each TFT needs to be acquired by searching the table, and thus multiple searches are required. The space and time of the algorithm for calculating the compensation value above is complicated, which has a high requirement on the calculation capability of the display module. Therefore, in this embodiment, the compensation value of the position corresponding to the temperature sensing circuit is first calculated, and then the compensation value of the position corresponding to the ordinary TFT is determined by means of fitting calculation.

In step 402, the corresponding pre-compensation parameters of the respective temperature sensing circuits in the scanning period T may be acquired by searching the table (such as the compensation display parameter lookup table 1102 in FIG. 2G) based on the sampled signals x'(u,v,T) of the respective temperature sensing circuits. The pre-compensation parameter may be a chromaticity coordinate compensation value.

Considering the limited calculation capability of the display module, the fitting algorithm should be easy to implement in this embodiment. There are many existing two-dimensional fitting algorithms. Although some algorithms have high calculation accuracy, they require high calculation capability and are complicated to implement. Therefore, in this embodiment, a binary quadratic polynomial is used for fitting. In this way, in step 404, the compensation display parameter of the main display panel is acquired by performing function fitting on the pre-compensation parameters corresponding to the plurality of temperature sensing circuits and the positions of the plurality of temperature sensing circuits with the binary quadratic polynomial. The polynomial coefficients of the binary quadratic polynomial may be determined by the least square method.

In this step, the compensation value O (u,v) corresponding to the TFT with the coordinate value of (u,v) may be expressed with the following binary quadratic polynomial:

$$O(u,v)=a_0+a_1u+a_2v+a_3u^2+a_4uv+a_5v^2$$

Based on the pre-compensation parameter acquired in the above step and the positions of the respective temperature sensing circuits, the polynomial coefficients $a_0$ to $a_5$ in the above formula may be determined by the least square method. Finally, based on the coordinate positions of the ordinary TFTs, the compensation values (which may also be referred to as a compensation map) corresponding to the positions of the respective TFTs in the auxiliary display panel may be acquired. The display parameters of the respective compensation regions in the main display panel are compensated with the compensation map. Thus, the problem of the chromaticity coordinate offset of the picture due to the temperature may be corrected.

Thus, through the distributed measurement of the temperature of the screen surface and by performing fitting to acquire the compensation map, the chromaticity coordinates of the local picture may be controlled.

The following briefly introduces one exemplary working process of the display method according to an embodiment of the present disclosure.

A display starts to work, and a gate driving circuit scans respective gate lines in the auxiliary display panel line by line based on the scanning frequency of the scanning clock signal. When the gate driving circuit scans the line in which the temperature sensing circuit is disposed, the temperature sensing TFT in the temperature sensing circuit is turned on. The temperature sensing TFT detects the temperature at the position of the temperature sensing TFT and generates a corresponding source/drain current I. The source/drain current I is converted to a voltage signal Vout after passing through the sampling resistor Rf. The counter receives the scanning clock signal. When the number of active levels of the scanning clock signal reaches the threshold, the sample and hold circuit is controlled to sample the voltage signal to acquire the sampled signal Vsample, and hold this sampled signal Vsample until the next sampling period. The control circuit 108 (which may include the FPGA) determines the compensation display parameter (such as RGB values to be compensated) based on the sampled signal Vsample and a preset Vsample-ACC table topological relationship. Afterwards, the control circuit 108 may compensate for the display parameter of the main display panel with the compensation display parameter so as to adjust the color shift caused by temperature to the correct chromaticity coordinates.

Figure 4:
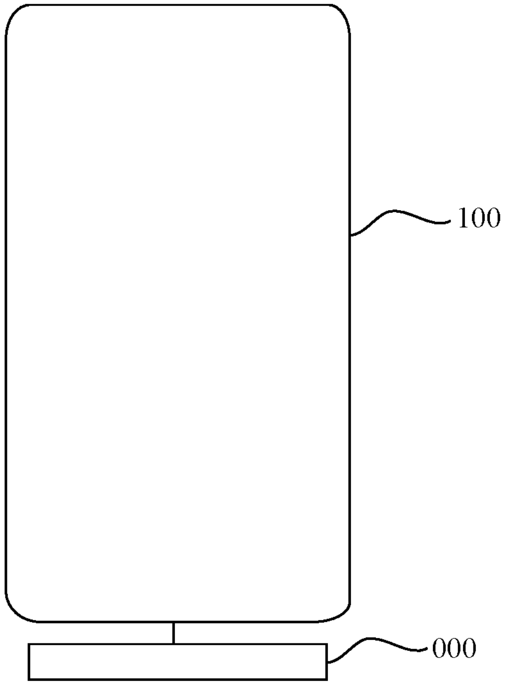
FIG. 4 shows a schematic diagram of an exemplary structure of a display device according to an embodiment of the present disclosure.

FIG. 4 is a structural schematic diagram of a display device according to an exemplary embodiment of the present disclosure. As shown in FIG. 4, the display device may include a power supply component 000 and a display module 100 coupled to the power supply component 000. The power supply component 000 is configured to supply power to the display module 100. The display module 100 is the display module according to the above embodiments. The specific structure of the display module 100 has been described in detail above and thus is not repeated here.

It should be understood by persons of ordinary skill in the art that the discussion about the embodiments above is merely exemplary and is not intended to imply that the scope of the present disclosure (including the claims) is limited to these embodiments. Based on the concept of the present disclosure, the above embodiments or technical features of different embodiments may be combined, steps may be executed in any order, there are many other variations in different aspects of the present disclosure as described above, which are not provided in the details for the sake of brevity.

In addition, in order to simplify descriptions and discussion and not to make the present disclosure difficult to understand, the connection between the well-known power supply/ground and the integrated circuit (IC) chip as well as other components may be shown or may not be shown in the presented figures. In addition, the devices may be shown in the form of a block diagram, in order not to make the present disclosure difficult to understand and in consideration of the fact that the details of implementations of these devices in block diagram are highly dependent on the platform on which the present disclosure is to be implemented (that is, these details should be fully within the scope to be understood by those skilled in the art). In the case that the specific details (such as circuits) are set forth in order to describe exemplary embodiments of the present disclosure, it should be apparent to persons skilled in the art that the present disclosure may be implemented without these specific details or under the circumstance that these specific details changes. Therefore, the descriptions are to be construed as illustrative instead of restrictive.

Although the present disclosure has been described in conjunction with specific embodiments of the present disclosure, various substitutions, modifications and variations of these embodiments will be apparent to persons of ordinary skill in light of the foregoing descriptions. For example, the discussed embodiments may be applied to other memory architectures (such as a dynamic RAM (DRAM)).

The present disclosure is intended to cover all substitutions, modifications, and variations that fall within the broad scope of the appended claims. Any omissions, modifications, equivalent substitutions, improvements and the like made within the spirit and principles of the present disclosure should be included within the scope of protection of the present disclosure.

What is claimed is:

1. A display module, comprising:

a main display panel, an auxiliary display panel and a backlight module which are laminated sequentially;

at least one temperature sensing circuit in the auxiliary display panel, wherein the temperature sensing circuit is configured to generate, based on temperature of the auxiliary display panel, a temperature signal related to the temperature, the temperature sensing circuit is further coupled to a gate line in the auxiliary display panel, and the temperature sensing circuit is configured to generate the temperature signal when the gate line provides a turn-on signal; and a control circuit coupled to the at least one temperature sensing circuit, wherein the control circuit is configured to adjust a display parameter of the main display panel based on the temperature signal;

the control circuit comprises:

a signal amplifying circuit, coupled to the temperature sensing circuit and configured to acquire an amplified signal by amplifying the temperature signal generated by the temperature sensing circuit;

a signal processing circuit, coupled to the signal amplifying circuit and configured to determine a compensation display parameter of the main display panel based on the amplified signal;

an adjusting circuit, coupled to the signal processing circuit and configured to adjust the display parameter of the main display panel with the compensation display parameter;

a clock circuit configured to output a sampling clock signal, wherein a sampling period of the sampling clock signal is an integral multiple of a scanning period, and a duration of the scanning period is a duration required to scan gate lines in the auxiliary display panel; and a sample and hold circuit coupled to the clock circuit, wherein the sample and hold circuit is configured to acquire a sampled signal by sampling the amplified signal when the sampling clock signal is at a first level, and stop sampling and keep outputting the sampled signal to the signal processing circuit when the sampling clock signal is at a second level.

2. The display module according to claim 1, wherein the control circuit is configured to:

determine a compensation display parameter of the main display panel based on the temperature signal; and adjust the display parameter of the main display panel with the compensation display parameter.

3. The display module according to claim 2, wherein the temperature sensing circuit comprises a thin film transistor, and the temperature signal is a source/drain current of the thin film transistor.

4. The display module according to claim 2, wherein the temperature sensing circuit comprises a thin film transistor and a sampling resistor, the sampling resistor is connected in series between the thin film transistor and a reference voltage terminal, and the temperature signal is a node voltage of a connection node between the sampling resistor and the thin film transistor.

5. The display module according to claim 2, further comprising a storage circuit configured to store a compensation display parameter lookup table, wherein the compensation display parameter lookup table stores a corresponding relationship between a signal value of the temperature signal and the compensation display parameter; and the control circuit is coupled to the storage circuit and is configured to:

acquire the compensation display parameter of the main display panel by searching the compensation display parameter lookup table based on the signal value of the temperature signal.

6. The display module according to claim 5, comprising a plurality of temperature sensing circuits, wherein the control circuit is configured to:

determine an average value of signal values of the temperature signals generated by the plurality of temperature sensing circuits; and acquire the compensation display parameter of the main display panel by searching the compensation display parameter lookup table based on the average value of the signal values.

7. The display module according to claim 5, comprising a plurality of temperature sensing circuits, wherein the control circuit is configured to:

acquire a pre-compensation parameter corresponding to each of the temperature sensing circuits by searching the compensation display parameter lookup table based on the temperature signal generated by each of the temperature sensing circuits;

acquire the compensation display parameter of the main display panel based on the pre-compensation parameter corresponding to each of temperature sensing circuits and a position of each of the temperature sensing circuits, wherein the main display panel comprises a plurality of compensation regions, and the compensation display parameter comprises a compensation value of each of the compensation regions; and compensate for a display parameter of each compensation region with the compensation value of the compensation region, wherein a projection of each of the temperature sensing circuits on the main display panel is within one of the compensation regions.

8. The display module according to claim 1, wherein the clock circuit is a counter and the counter is configured to:

count active levels of a scanning clock signal that scans the auxiliary display panel, output the sampling clock signal of the second level when the count value is less than a threshold, and output the sampling clock signal of the first level and clear the count value when the count value is equal to the threshold, wherein the threshold is an integral multiple of a total number of the gate lines.

9. The display module according to claim 1, wherein the temperature sensing circuit is further coupled to an input signal line, a gate line and an output signal line; and the temperature sensing circuit is configured to:

generate, based on the temperature of the auxiliary display panel, the temperature signal related to the temperature and transmit the temperature signal to the control circuit through the output signal line, under the drive of a driving signal provided by the input signal line when the gate line provides a turn-on signal.

10. The display module according to claim 9, wherein the auxiliary display panel comprises a plurality of dimmers arranged in an array, and the display module comprises a plurality of temperature sensing circuits arranged in an array in the auxiliary display panel, wherein each temperature sensing circuit and at least one dimmer which are disposed in the same row are coupled to the same gate line, and the temperature sensing circuits in the same column are coupled to the same input signal line.

11. The display module according to claim 9, wherein the control circuit comprises a plurality of chip-on films spaced from each other in the auxiliary display panel, a region where the temperature sensing circuit is disposed is intersected with a target extending line, the target extending line is an extending line of a center line of a spacing region between adjacent chip-on films in a display region, and the input signal line and/or the output signal line coupled to the temperature sensing circuit is a dummy lead of the chip-on film.

12. A display method of a display module, wherein the display module comprises a main display panel, an auxiliary display panel and a backlight module which are laminated sequentially, and at least one temperature sensing circuit in the auxiliary display panel; the method comprising:

acquiring a temperature signal related to temperature of the auxiliary display panel, wherein the temperature signal is generated by the temperature sensing circuit based on temperature of the auxiliary display panel; and adjusting a display parameter of the main display panel based on the temperature signal;

wherein the temperature sensing circuit is further coupled to a gate line in the auxiliary display panel, and the temperature sensing circuit is configured to generate the temperature signal when the gate line provides a turn-on signal; and determining the compensation display parameter of the main display panel based on the temperature signal comprises:

acquiring an amplified signal by amplifying the temperature signal;

acquiring a sampled signal by sampling the amplified signal according to a sampling period; and determining the compensation display parameter of the main display panel based on the sampled signal, wherein the sampling period is an integral multiple of a scanning period, and a duration of the scanning period is a duration required to scan gate lines in the auxiliary display panel.

13. The method according to claim 12, wherein adjusting the display parameter of the main display panel based on the temperature signal comprises:

determining a compensation display parameter of the main display panel based on the temperature signal; and adjusting the display parameter of the main display panel with the compensation display parameter.

14. The method according to claim 13, wherein the display module comprises a plurality of temperature sensing circuits; and determining the compensation display parameter of the main display panel based on the temperature signal comprises:

determining an average value of signal values of the temperature signals generated by the plurality of temperature sensing circuits; and acquiring the compensation display parameter of the main display panel by searching a compensation display parameter lookup table based on the average value of the signal values, wherein the compensation display parameter lookup table stores a corresponding relationship between the signal value of the temperature signal and the compensation display parameter.

15. The method according to claim 13, wherein the display module comprises a plurality of temperature sensing circuits;

determining the compensation display parameter of the main display panel based on the temperature signal comprises:

acquiring a pre-compensation display parameter corresponding to each of the temperature sensing circuits by searching a compensation display parameter lookup table based on the temperature signal generated by each of the temperature sensing circuits; and acquiring the compensation display parameter of the main display panel based on the pre-compensation parameter corresponding to each of temperature sensing circuits and a position of each of the temperature sensing circuits, wherein the main display panel comprises a plurality of compensation regions, the compensation display parameter comprises a compensation value of each of the compensation regions, and a projection of each of the temperature sensing circuits on the main display panel is within one of the compensation regions; and adjusting the display parameter of the main display panel with the compensation display parameter comprises:

compensating for a display parameter of each compensation region with the compensation value of the compensation region.

16. The method according to claim 15, wherein acquiring the compensation display parameter of the main display panel based on the pre-compensation parameter corresponding to each of temperature sensing circuits and the position of each of the temperature sensing circuits comprises:

acquiring the compensation display parameter of the main display panel by performing function fitting on the pre-compensation parameter corresponding to each of temperature sensing circuits and the position of each of temperature sensing circuits by using a binary quadratic polynomial.

17. A display device, comprising a power supply component and a display module, wherein the display module comprises:

a main display panel, an auxiliary display panel and a backlight module which are laminated sequentially;

at least one temperature sensing circuit in the auxiliary display panel, wherein the temperature sensing circuit is configured to generate, based on temperature of the auxiliary display panel, a temperature signal related to the temperature, the temperature sensing circuit is further coupled to a gate line in the auxiliary display panel, and the temperature sensing circuit is configured to generate the temperature signal when the gate line provides a turn-on signal; and a control circuit coupled to the at least one temperature sensing circuit, wherein the control circuit is configured to adjust a display parameter of the main display panel based on the temperature signal;

the control circuit comprises:

a signal amplifying circuit, coupled to the temperature sensing circuit and configured to acquire an amplified signal by amplifying the temperature signal generated by the temperature sensing circuit;

a signal processing circuit, coupled to the signal amplifying circuit and configured to determine a compensation display parameter of the main display panel based on the amplified signal;

an adjusting circuit, coupled to the signal processing circuit and configured to adjust the display parameter of the main display panel with the compensation display parameter;

a clock circuit configured to output a sampling clock signal, wherein a sampling period of the sampling clock signal is an integral multiple of a scanning period, and a duration of the scanning period is a duration required to scan gate lines in the auxiliary display panel; and a sample and hold circuit coupled to the clock circuit, wherein the sample and hold circuit is configured to acquire a sampled signal by sampling the amplified signal when the sampling clock signal is at a first level, and stop sampling and keep outputting the sampled signal to the signal processing circuit when the sampling clock signal is at a second level.

* * * * *